US006929516B2

(12) United States Patent
Brochu et al.

(10) Patent No.: US 6,929,516 B2
(45) Date of Patent: Aug. 16, 2005

(54) BATHING UNIT CONTROLLER AND CONNECTOR SYSTEM THEREFORE

(75) Inventors: Christian Brochu, Quebec (CA); Benoit Laflamme, Quebec (CA); Pascal Recoura, Quebec (CA)

(73) Assignee: 9090-3493 Québec Inc., Québec (CA)

( * ) Notice: Subject to any disclaimer, the term of this patent is extended or adjusted under 35 U.S.C. 154(b) by 0 days.

(21) Appl. No.: 10/693,868

(22) Filed: Oct. 28, 2003

(65) Prior Publication Data

US 2005/0090153 A1 Apr. 28, 2005

(51) Int. Cl.[7] .......................... H01R 13/64; H02J 4/00

(52) U.S. Cl. ...................... 439/677; 439/680; 439/681; 307/149

(58) Field of Search ............................... 439/677, 680, 439/681; 307/149, 11; 361/104

(56) References Cited

U.S. PATENT DOCUMENTS

| | | | | |
|---|---|---|---|---|
| 3,609,636 A | | 9/1971 | La Grange et al. | |
| 4,159,862 A | | 7/1979 | Funck et al. | |
| 4,296,992 A | | 10/1981 | Gallagher | |
| 4,350,409 A | | 9/1982 | Kato et al. | |
| 4,386,333 A | | 5/1983 | Dillan | |
| 4,758,174 A | | 7/1988 | Michaels et al. | |
| 5,245,221 A | * | 9/1993 | Schmidt et al. | 307/112 |
| 5,254,019 A | * | 10/1993 | Noschese | 439/681 |
| 5,370,556 A | | 12/1994 | Olsson | |
| 5,401,181 A | | 3/1995 | Wilson | |
| 5,421,746 A | * | 6/1995 | David | 439/701 |
| 5,520,555 A | | 5/1996 | Taylor | |
| 5,685,727 A | | 11/1997 | Cairns | |
| 5,733,148 A | * | 3/1998 | Kaplan et al. | 439/680 |
| 6,218,846 B1 | * | 4/2001 | Ludwig et al. | 324/713 |
| 6,379,169 B1 | | 4/2002 | Corona | |
| 6,407,469 B1 | * | 6/2002 | Cline et al. | 307/11 |
| 6,495,931 B2 | | 12/2002 | Loyd et al. | |
| 6,540,549 B2 | * | 4/2003 | Rupert | 439/502 |
| 2002/0089235 A1 | | 7/2002 | Loyd et al. | |
| 2002/0089236 A1 | * | 7/2002 | Cline et al. | 307/149 |
| 2004/0070911 A1 | * | 4/2004 | Tran | 361/104 |

FOREIGN PATENT DOCUMENTS

| | | |
|---|---|---|
| DE | 101 13 223 A1 | 10/2002 |
| EP | 0 033 286 A2 | 8/1981 |
| GB | 930509 A | 7/1963 |

OTHER PUBLICATIONS

European Search Report issued Mar. 16, 2004 for EU application EP 04 29 2314.

* cited by examiner

*Primary Examiner*—Chandrika Prasad

(57) ABSTRACT

A controller suitable for use in controlling components in a bathing unit is provided. The controller includes a plurality of connectors adapted for providing electrical power to respective bathing unit components. Each connector includes a set of contact elements arranged in a common configuration. A first subset of the set of contact elements is adapted for generating a power signal characterized by a first current-voltage combination and a second subset of the set of contact elements is adapted for generating a power signal characterized by second current-voltage combination. In accordance with another aspect, a keying system is providing including a key member for engaging a connector and a complementary key member for engaging a electrical plug. The keying system enables the electrical plug and the connector to establish an electrical connection when the key member and then complementary key member match.

42 Claims, 9 Drawing Sheets

CONTACT ELEMENT

| DIAGRAM | 40A | 40B | 40C | 40D | 40E | 40F |
| --- | --- | --- | --- | --- | --- | --- |
| (A)  | SINGLE OUTPUT 120V, 15A | | | | | |
| | X | | | X | X | |
| (B)  | SINGLE OUTPUT 120V, 20A | | | | | |
| | X | | X | | X | |
| (C)  | SINGLE OUTPUT 240V, 15A | | | | | |
| | | | | X | X | X |
| (D)  | SINGLE OUTPUT 240V, 20A | | | | | |
| | | | X | | X | X |
| (E)  | DUAL OUTPUT 240V, 15A | | | | | |
| | | X | | X | X | X |
| (F)  | DUAL OUTPUT 240V, 20A | | | | | |
| | | X | X | | X | X |
| (G)  | DUAL OUTPUT 120V, 15A | | | | | |
| | X | X | | X | X | |
| (H)  | DUAL OUTPUT 120V, 20A | | | | | |
| | X | X | X | | X | |

BATHING UNIT CONTROLLER AND CONNECTOR SYSTEM THEREFORE

FIELD OF THE INVENTION

The present invention relates to controllers suitable for use in bathing units and, more particularly, to controllers having a plurality of connectors for connection to bathing unit components.

BACKGROUND

A bathing unit, such as a spa, typically includes various components such as a water holding receptacle, pumps to circulate water in a piping system, a heating module to heat the water, a filter system, an air blower, an ozone generator, a lighting system, and a control system for activating and managing the various parameters of the bathing unit components. Other types of bathing units having similar components include, for instance, whirlpools, hot tubs, bathtubs, therapeutic baths, and swimming pools.

Typically, the control system of a bathing unit includes a controller to which are connected the various bathing unit components. The controller is adapted to control the power supplied to each one of the connected components. The controller receives input signals from various input devices, such as for example a plurality of sensors that monitor the various components of the bathing unit and from a control panel allowing a user to control various operational settings of these components. In response to the input signals, the controller activates, or deactivates, the various bathing unit components by supplying power, or ceasing to supply power, to the components.

Usually, different components in a given bathing unit have different operating power requirements. For instance, some of the bathing unit components may require to be powered by way of a 120 volts (V) AC voltage source, while other bathing unit components may require to be powered via a 240 volts (V) AC voltage source. Similarly, different bathing unit components may be designed to operate with different maximum current draws. The current draw to operate the various bathing unit components may range, for example, from 0.1 amps (A) for an ozone generator to 20 amps (A) for a large pump. Moreover, the current draw to operate two bathing components of a same type, such as two pumps or two heating modules, may also be different for the two components. For instance, one pump may require a current draw of 12 amps (A) to operate, while another pump may require a current draw of 20 amps (A) to operate.

In order to accommodate bathing unit components having different power requirements, controllers typically include a plurality of connectors, each connector being adapted to supply power to that particular component in accordance with its power requirements. To achieve this, each connector usually includes a set of electrical contact elements, at which a certain voltage or current output will be available. For example, if a bathing unit includes one component having operating power requirements of 120 volts (V) and 12 amps (A) and another component having operating power requirements of 240 volts (V) and 20 amps (A), the controller will thus be configured to include one connector having contact elements at which an output of 120 volts (V) and 12 amps (A) will be available and another connector having contact elements at which an output of 240 volts (V) and 20 amps (A) will be available.

A deficiency of such a controller configuration is that a bathing unit installer or service person runs the risk of connecting a given bathing unit component to a wrong connector, i.e. in a connector not intended to be connected to that given component. For instance, in the above example, the component with operating power requirements of 120 volts (V) and 12 amps (A) runs the risk of being connected to the controller connector at which an output of 240 volts (V) and 20 amps (A) will be available.

A proposed solution for avoiding such erroneous connections from being made is to design the controller such that the contact elements of each one of its connectors are arranged in a distinct configuration. This can be achieved, for example, by varying the relative distances separating the contact elements on each connector or, alternatively, by arranging the contact elements of each connector in altogether different patterns. Each bathing unit component includes a connector having complementary contact elements arranged in the same distinct configuration as that of the contact elements of the controller connector to which it is intended to be connected. In that way, a controller connector having contact elements arranged in a specific configuration can only be connected to a bathing unit component connector having complementary contact elements arranged in the same specific configuration.

A deficiency of controllers and bathing unit components of the type described above is that such controllers must be designed and manufactured specifically on the basis of the type, number, and power requirements of the different bathing unit components to which it will eventually be connected. From the perspective of a controller manufacturer, this translates into non-optimal production costs or, at the very least, prevents significant economies of scale from being realized. Furthermore, sufficient amounts of inventory of each different type of connectors must be kept in stock such as to allow for the assembly and/or repair of the controllers which adds to the controller manufacturer's costs. Similarly, since the design of the connector associated to a given bathing unit component is dictated by the design of the controller connector to which it is intended to be connected to, this will entail a tailoring of the manufacturing process of that bathing unit component as well. Consequently, the manufacturer of that given bathing unit component will also experience non-optimal production costs.

Against the background described above, it appears that there is a need in the industry to provide a controller suitable for a bathing unit that alleviates at least in part the problems associated with existing controllers.

SUMMARY

In accordance with a first broad aspect, the invention provides a controller suitable for use in controlling components in a bathing unit. The controller comprises a plurality of connectors adapted for providing electrical power to respective bathing unit components. Each connector includes a set of contact elements arranged in a common configuration. A first subset of the set of contact elements is adapted for generating a power signal characterized by a first current-voltage combination and a second subset of the set of contact elements is adapted for generating a power signal characterized by second current-voltage combination.

In accordance with a specific implementation, the controller further includes a plurality of key members connected to respective connectors in the plurality connectors so as to allow bathing unit components having complementary key members to be connected to connectors having key members matching the complementary key members. The key members may releasably engage the connectors or may be permanently attached thereto.

In accordance with a specific implementation, the first subset of the set of contact elements is adapted for establishing electrical connections with complementary contact elements associated to a first bathing unit component such as to release a signal characterized by the first current-voltage combination. Similarly, the second subset of the set of contact elements is adapted for establishing electrical connections with complementary contact elements associated to a second bathing unit component such as to release a signal characterized by the second current-voltage combination.

In accordance with a specific implementation, each of the connectors is adapted to acquire an actuated state and a non-actuated state. When in the actuated state, a connector is adapted for providing electrical power to a bathing unit component, and, when in the non-actuated state, a connector is prevented from providing electrical power to a bathing unit component. The controller includes a control circuit adapted for controlling a supply of power to the plurality of connectors. In a non-limiting implementation, the control circuit is adapted for receiving control signals associated to components in the bathing unit and for causing selected ones of the plurality of connectors to acquire either one of the actuated state and the non-actuated state on the basis of the control signals.

In accordance with another broad aspect, the invention provides a connector suitable for providing electrical power to a bathing unit component. The connector includes a set of contact elements. A first subset of the set of contact elements is adapted for generating a power signal characterized by a first current-voltage combination and a second subset of said set of contact elements is adapted for generating a power signal characterized by second current-voltage combination.

In a specific example of implementation, the set of contact elements includes a plurality of subsets of contact elements associated to respective current-voltage combinations.

In accordance with another broad aspect, the invention provides a controller suitable for use in controlling components in a bathing unit. The controller comprises a plurality of connectors for supplying electrical power to a set of bathing unit components. The controller also comprises a plurality of key members connected to respective connectors in the plurality connectors so as to allow bathing unit components having complementary key members to be connected to connectors having key members matching the complementary key members.

In specific implementations, the key members may releasably engage the connectors or may be permanently attached thereto.

In a specific implementation, the plurality of key members defines a bathing unit component connection pattern when connected to the plurality of connectors. The controller comprises a control circuit adapted for controlling a supply of power to the plurality of connectors in accordance with the bathing unit component connection pattern.

In accordance with another broad aspect, the invention provides a keying system suitable for use in a bathing unit controller. The bathing unit controller includes a connector adapted for providing electrical power to a bathing unit component, where the bathing unit component includes an electrical plug. The keying system comprises a key member adapted for engaging the connector and a complementary key member adapted for engaging the electrical plug of the bathing unit, so as to enable the electrical plug and the connector to establish an electrical connection when the key member and the complementary key member match.

In specific implementation, the key member is adapted for releasably engaging the connector or, alternatively, for being permanently attached thereto. Similarly, the complementary key member is adapted for releasably engaging the electrical plug or, alternatively, for being permanently attached thereto.

In accordance with another broad aspect, the invention provides a bathing unit component suitable for use in a bathing unit having a controller. The controller comprises a plurality of connectors for supplying electrical power to a set of bathing unit components. The bathing unit component comprises a plug member having a complementary key member connected to the plug so as to allow the bathing unit component to be connected to a connector on the controller having a matching key.

In accordance with yet another broad aspect, the invention provides in combination a controller and a plurality of bathing unit components. The controller is suitable for use in controlling the bathing unit components and comprises a plurality of connectors. Each connector includes a set of contact elements arranged in a common configuration. A first subset of the set of contact elements is adapted for generating a power signal characterized by a first current-voltage combination and a second subset of the set of contact elements is adapted for generating a power signal characterized by second current-voltage combination. Each of the plurality of bathing unit components is adapted to engage a respective one of the plurality of connectors.

In a specific implementation, the combination further includes a plurality of key members adapted for engaging the plurality connectors and a plurality of complementary key members adapted for engaging respective plurality of bathing unit components. The plurality of complementary key members allows the bathing unit components to be connected to connectors having a matching key.

In accordance with another broad aspect, the invention provides a controller suitable for use in controlling components in a bathing unit. The controller includes a plurality of connector means for supplying electrical power to a set of bathing unit components and a plurality of key means adapted connected to respective connector means in the plurality of connector means. The plurality of key means allowing allow bathing unit components having complementary key members to be connected to connector means having key means matching the complementary key members.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of the embodiments of the present invention is provided herein below, by way of example only, with reference to the accompanying drawings, in which.

Figure 1:
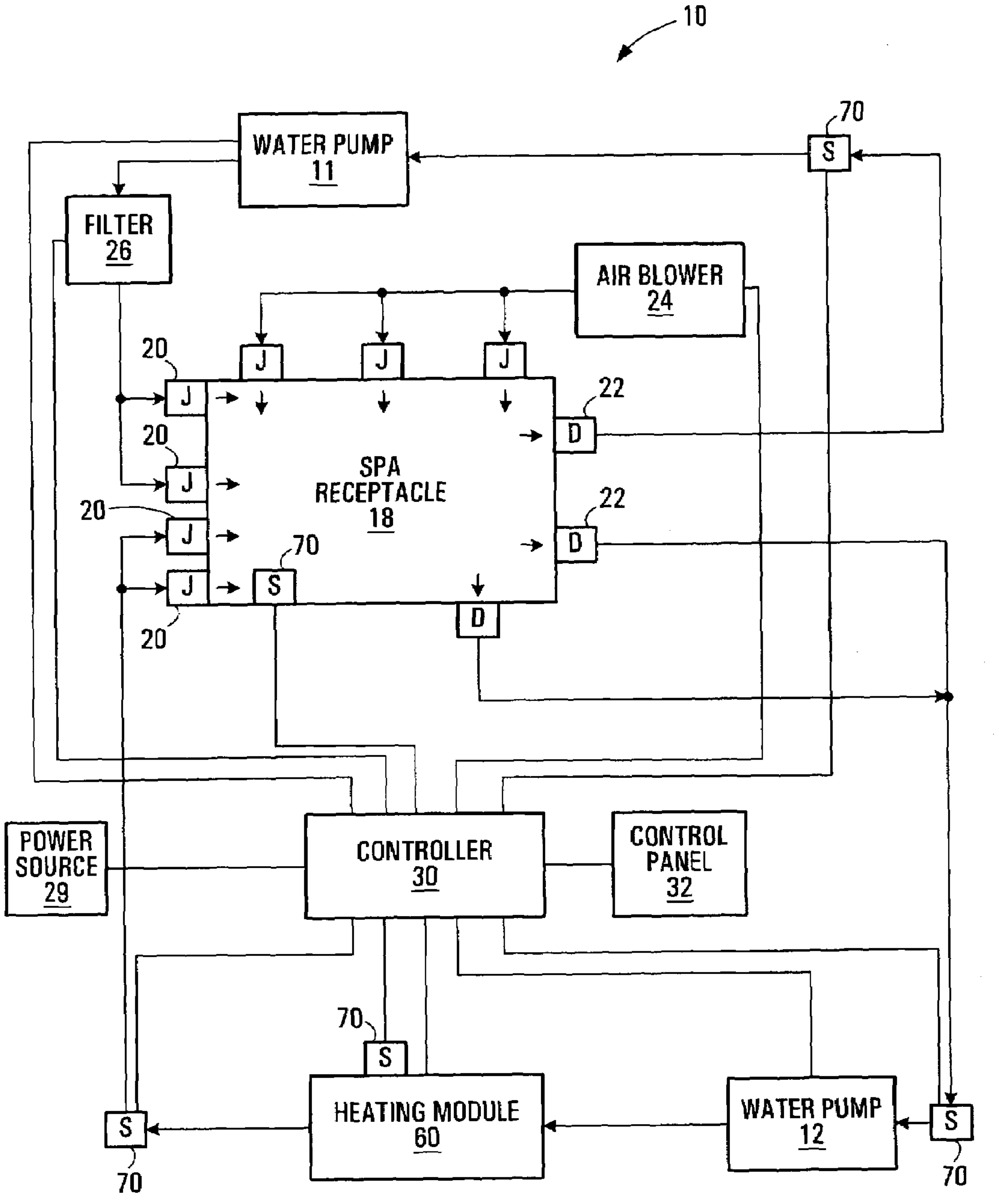
FIG. 1 shows a block diagram of a spa system equipped with a controller in accordance with a specific example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The description below is directed to a specific implementation of the invention in the context of a spa system. It is to be understood that the term "spa system", as used for the purposes of the present description, refers to spas, whirlpools, hot tubs, bathtubs, therapeutic baths, swimming pools and any other type of bathing unit that can be equipped with a control system for controlling various operational settings.

FIG. 1 illustrates a block diagram of a spa system 10 in accordance with a specific example of implementation. The spa system 10 includes a spa receptacle 18 for holding water, a plurality of jets 20, a set of drains 22 and a control system. In the non-limiting embodiment shown, the control system includes a control panel 32, a controller 30, and a plurality of sensors 70 that monitor the various components of the spa. For example, the sensors 70 may include temperature and liquid level sensors to respectively monitor the water temperature and water level at various locations in the spa system 10.

In the specific embodiment shown in FIG. 1, the spa system 10 further includes a plurality of spa components in the form of a heating module 60, two water pumps 11 & 12, a filter 26 and an air blower 24. It should be understood that the spa system 10 could include more or less spa components without departing from the spirit of the invention. For example, although not shown in FIG. 1, the spa system 10 could include a lighting system for lighting up the water in the receptacle 18.

In normal operation, water flows from the spa receptacle 18, through drain 22 and is pumped by water pump 12 through heating module 60 where the water is heated. The heated water then leaves the heating module 60 and re-enters the spa receptacle 18 through jets 20. In addition, water flows from the spa receptacle 18, through drain 22 and is pumped by water pump 11 through filter 26. The filtered water then re-enters the spa receptacle 18 through jets 20. Water can flow through these two cycles continuously while the spa system 10 is in operation. The air blower 24 is operative for delivering air bubbles to the spa receptacle 18.

The control system is operative for controlling the various components of the spa system 10. The control panel 32 of the control system is typically in the form of a user interface that allows a user to enter commands for controlling the various operational settings of the spa. Some non-limiting examples of operational settings of the spa include temperature control settings, jet control settings, and lighting settings. In a non-limiting embodiment where the spa is connected to entertainment and/or multimedia modules, the operational settings of the spa may also include audio settings and video settings, amongst others. Consequently, the expression "operational settings", for the purpose of the present invention, is intended to cover operational settings for any suitable equipment that can be used by a spa bather.

The control system receives electrical power from an electric power source 29 that is connected to the controller 30. The controller 30 is then able to control the distribution of power supplied to the various spa components on the basis of control signals received from the various sensors 70 and the control panel 32 in order to cause the desired operational settings to be implemented.

Figure 2:
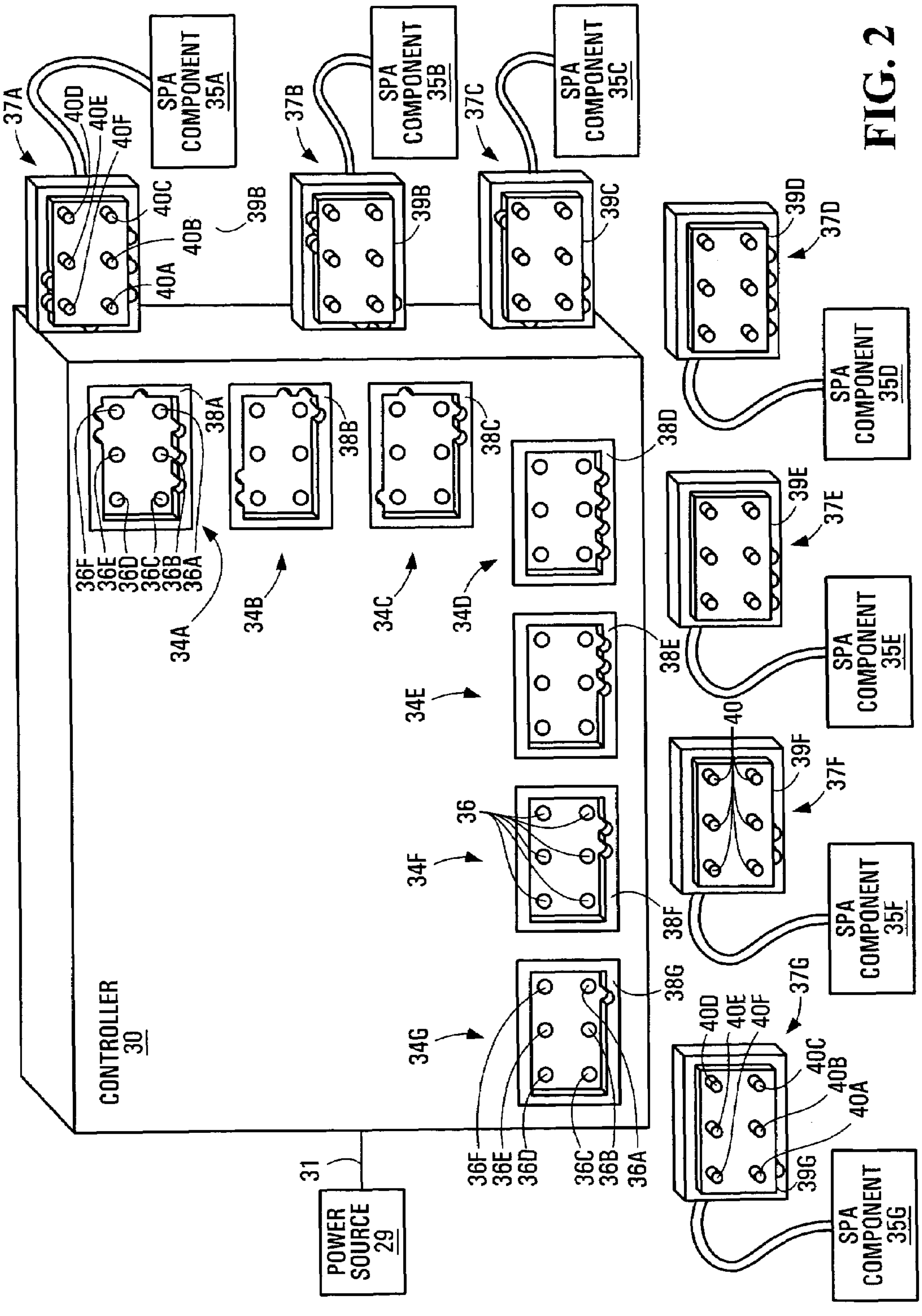
FIG. 2 shows a schematic representation of the controller of FIG. 1 in accordance with a specific example of implementation of the present invention.

With reference to FIG. 2, the power source 29 supplies the controller 30 with any suitable power service suitable for residential or commercial use, via service wiring 31. In a non-limiting implementation, the power source 29 can supply 240 volts (V) rms to the controller 30 via service wiring 31. In an alternative non-limiting implementation, the power source 29 can supply 120 volts (V) rms to the controller 30 via service wiring 31. It is to be appreciated that other voltage supply values, for example depending on geographical location, are possible without detracting from the spirit of the invention.

In the specific example of implementation shown in FIG. 2, the controller 30 comprises a plurality of connectors 34A–34G are adapted for providing electrical power to respective spa components 35A–35G and electrical circuitry (not shown in the figure) adapted for controlling the supply of power to the plurality of connectors 34A–34G. In a specific implementation, the spa components 35A–35G include, for example, pumps, a heating module, an air blower, and a lighting system. Although FIG. 2 shows the controller 30 as including seven connectors 34A–34G for supplying electrical power to seven spa components 35A–35G, it should be understood that the controller 30 could include any suitable number of connectors 34 for providing electrical power to desired number of spa components without detracting from the spirit of the invention.

Each one of the connectors 34A–34G, comprises a plurality of contact elements 36. In the specific embodiment shown in FIG. 2, each connector 34 includes six contact elements 36A–36F, which are shown with respect to connector 34A and 34G. It should be understood, however, that more or fewer contact elements 36 could be included within each connector 34 without departing from the spirit of the invention.

The plurality of contact elements 36 in each connector 34 are arranged in a common configuration, such that the number of contact elements 36, and their position relative to each other, is the same for each one of the connectors 34. In the specific embodiment shown in FIG. 2, the contact elements 36 are arranged in an array of two rows and three columns. It will be readily apparent to the person skilled in the art in light of the present description that other suitable arrangements and configurations of the contact elements 36 are also included within the scope of the present invention.

In a specific implementation, the contact elements 36 are electrically connected to electrical circuitry, such as a printed-circuit board or other suitable control circuit element, that is mounted in the controller 30 and that is adapted to convert the power received from the electric power source 29 into a particular voltage and/or current applied to each one of the contact elements 36. In a specific implementation, each contact element 36 is a terminal at which a particular voltage, a particular current, or a ground terminal will be available. The same voltage, current or ground terminal available at one contact element 36 will be available at corresponding contact elements 36 of each one of connectors 34. For example, contact element 36A of each connector 34A–34G will have the same particular output; contact element 36B of each connector 34A–34G will have the same particular output; and so on. Optionally, (not shown in the drawings), the set of contact elements 36 may include one or more data ports, such as serial links, for allowing data to be transmitted to and received from spa components 35 through connectors 34.

As will be described in further detail below, the set of contact elements 36A–36F of each connector 34 includes various subsets of contact elements 36. Each subset of contact elements 36 is made up of a combination of two or more of the individual contact elements 36 within the set of contact elements 36A–36F that together generate a power signal characterized by a current-voltage combination. For example, contact elements 36A, 36D and 36E, could form a first subset of contact elements that is characterized by a first current-voltage combination. In a specific implementation, each set of contact elements 36A–36F includes at least a first subset of contact elements adapted for generating a power signal characterized by a first current-voltage combination, and a second subset of contact elements adapted for generating a power signal characterized by a second current-voltage combination. Accordingly, various combinations of voltage and current outputs can be made available at each connector 34, where each connector has a set of contact elements 36 arranged in a common configuration.

Each connector 34 is adapted to be connected to a respective one of a plurality of component connectors 37A–37G, as shown in FIG. 2. Each one of the component connectors 37A–37G forms a plug that is disposed at the end of an electrical cable extending from a respective one of the spa components 35A–35G.

Each component connector 37 includes a plurality of complementary contact elements 40 for establishing an electrical contact with a corresponding contact element 36 in the connector 34. In one specific embodiment, the contact elements 36A–36F are female and the complementary contact elements 40A–40F are male. In an alternative embodiment, the contact elements 36A–36F are male and the complementary contact elements 40A–40F are female. In the specific example shown in FIG. 2, each component connector 37 includes six complementary contact elements 40A–40F (shown with respect to complementary connector 37G). In a non-limiting implementation, the complementary contact elements 40A–40F are disposed in the same particular configuration as the contact elements 36 of the connectors 34A–34G.

Although FIG. 2 shows each component connector 37 as having a number of complementary contact elements 40 that corresponds to the number of contact elements 36 of connectors 34, this is not necessary. Depending on the power requirements of the particular spa component 35 to which it is associated, each component connector 37 may only include certain ones of the complementary contact elements 40. For example, if the spa component 35A requires an input voltage of 120 volts (V) and an input current of 15 amps (A), then component connector 37A may include only complementary contact elements 40A, 40D, and 40E, and will not include complementary contact elements 40B, 40C, and 40F. Alternatively, component connector 37A could include each one of the complementary contact elements 40A–40F, but with complementary contact elements 40B, 40C, and 40F disabled, such that they are not connected to any internal conductor wires extending at component 35A. For safety reasons, in practical physical implementations, the ground contact element 40E should be included (or enabled) in the set of complementary contact elements 40.

Although the above embodiments showed connectors 34 each having six contact elements 36A–36F disposed in a rectangular array, and component connectors 37 each having six complementary contact elements 40A–40F disposed in a corresponding rectangular array, this was for purposes of illustration only. Accordingly, it will be appreciated that the connectors 34 could each include another number of contact elements 36 arranged in another desired configuration, and that the component connectors 37 could each support a corresponding number of complementary contact elements 40 arranged in a corresponding configuration.

The controller 30 having the connectors 34 outlined above presents multiple advantages. For instance, the common configuration of the set of contact elements 36A–36F having subsets of contact elements 36 provides for the possibility of connecting different spa components 35 having different power requirements to any one of the connectors 34. The actual voltage and current that will be supplied to a given spa component 35 will be dictated by which ones of the complementary contact elements 40 are present (or enabled, if all of the complementary contact elements 40 are included) on the component connector 37 associated to that given spa component 35. This allows that a same connector 34 be used to provide power to different spa components 35, even though the power requirements for the different spa components 35 might be different. This allows to design controllers having uniform connectors independently from the type, number, and power requirements of the different bathing unit components to which it will eventually be connected. From the perspective of a controller manufacturer, this may translate into improved production costs and possible economies of scale.

Another advantage of the above described embodiments of the present invention is that the common configuration of the connectors 34 allows the connectors 34 to be manufactured in a greater number based on a common contact element configuration, thereby translating into improved production costs and a reduction in inventory of the different connectors 34 for the controller manufacturer. Similarly, the common configuration of the component connectors 37 results in a greater number of component connectors 37 capable of being manufactured on the basis of a single design, which again translates improved reduction costs and a reduction in inventory of the different component connectors for the spa component manufacturer.

In a specific implementation, shown in FIG. 2, a key member 38 is engaged in each connector 34 and a complementary key member 39 is connected to each component connector 37. The key member 38 in combination with the complementary key member 39 form a keying system for enabling a given one of the connectors 34A–34G to connect to a given one of the component connectors 37A–37G when their respective key member 38 and complementary key member 39 match. In a non-limiting implementation, the key member 38 and the complementary key member 39 are designed in a such a way that the connectors 34 can be connected only to a component connector 37 having a matching complementary key member 39, and cannot be connected to a component connector 37 having a non-matching complementary key member 39. It will be appreciated that certain keying system designs may allow for multiple complementary key members 39 to engage a same connector 34.

The combination of a key member 38 and a complementary key member 39 forms a keying system. In a specific implementation, the key members 38A–38G are made as separate articles and are installed on the connectors 34 at the end of the manufacturing process. Similarly, each complementary key member 39 can be made as a separate article and can be installed on a component connector 37 at the end of the manufacturing of the component 35 and component connector 37. Alternatively, the key members 38A–38G can be made as integral parts of connectors 34 and complementary key member 39 can be made as an integral part of component connector 37.

When a set of key members is engaged in the connectors 34 of controller 30, a connection pattern for the spa components 35 is defined. For example, if a key member associated to a pump is engaged in connector 34G, and a key member associated to a heating member is engaged in connector 34F then a connection pattern having a pump at position 34G and a heating element at position 34F will be defined. Since the controller 30 is adapted to control the distribution of power supplied to various spa components, the use of the key members 38 and complementary key members 39 prevents a spa installer or service person from connecting a spa component 35 in the wrong connector 34 of the controller 30. In addition, since the connection pattern is defined by the set of keys engaged in the connectors, the circuitry of the controller 30 can be configured to control the spa components on the basis of the connection pattern defined by the set of key members engaged in the connectors 34.

The keying system comprising key members 38 and complementary key members 39 provides an advantage of being able to define a particular connector 34 as the connector 34 intended to be connected with a particular spa component 35. More specifically, the key member 38 that is engaged to a particular connector 34 allows a component connector 37 equipped with a matching complementary key member 39 to be connected with that particular connector 34.

Having presented a general overview of the spa controller 30 and connector system, specific examples of implementation of each element of the spa controller 30 and connector system will now be presented.

Figure 3A:
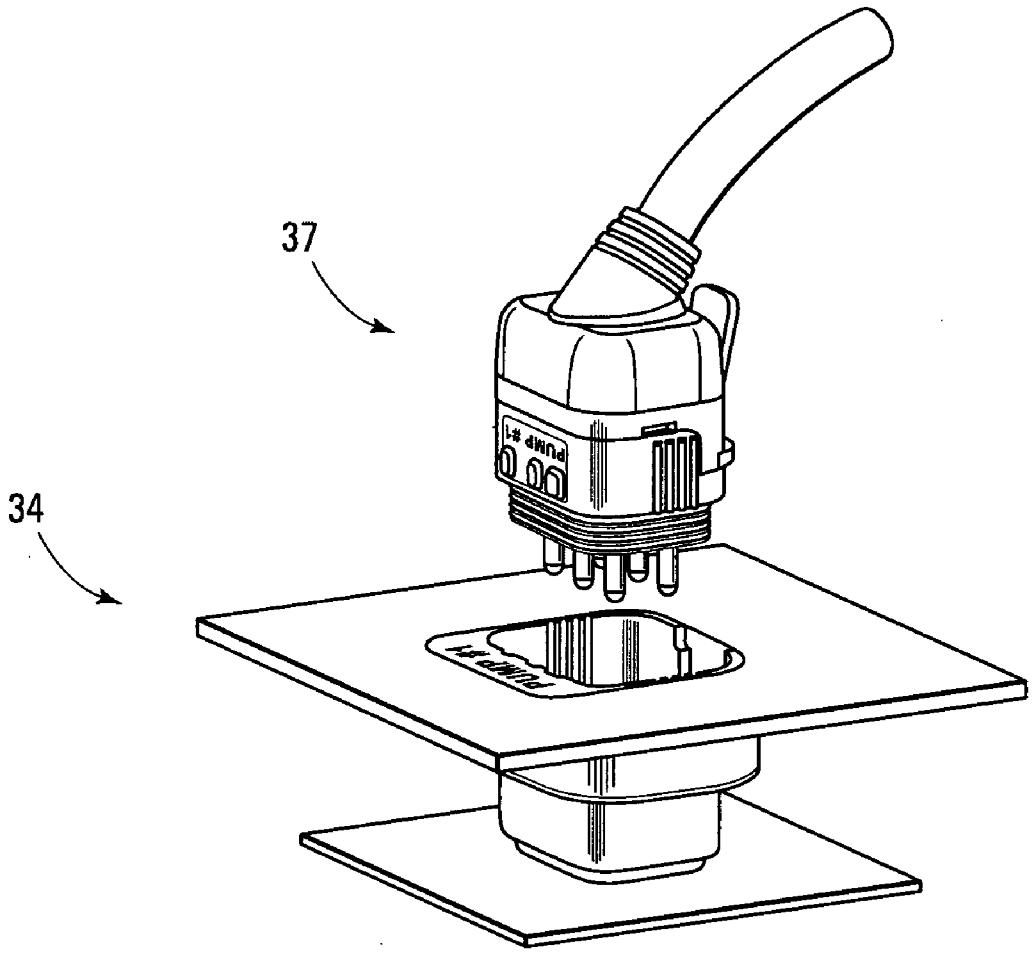
FIG. 3A shows a perspective view of a connector system including a connector and spa component connector in accordance with a specific example of implementation of the present invention.
Figure 3B:
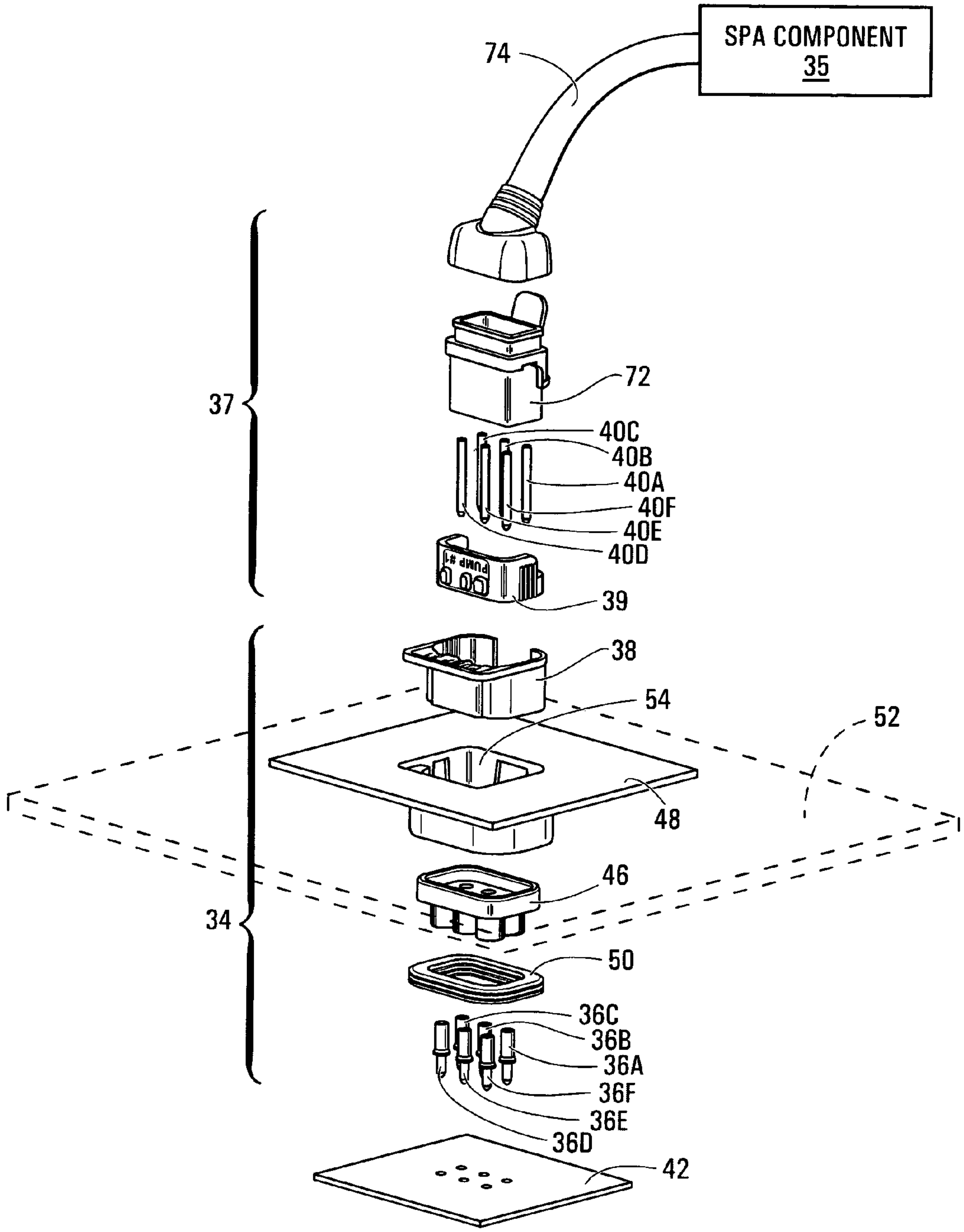
FIG. 3B is an exploded view of the connector system shown in FIG. 3A.

With reference to FIGS. 3A and 3B, a non-limiting example of implementation of one of the connectors 34 and of one of the component connectors 37 will be described. It is to be understood that the following description could be applied to the any one of the connectors 34A–34G of the controller 30 and any one of the component connectors 37A–37G shown in FIG. 2.

The connector 34 comprises a set of contact elements 36A–36F, which, in the specific embodiment shown in FIG. 3B, comprises six female contact elements 36A–36F in the form of pin receptacles that are made of an electrically conductive material. The contact elements 36A–36F are adapted to receive complementary contact elements 40A–40F, in the form of male pins, from the component connector 37. It should be understood that in an alternative embodiment, the contact elements 36A–36F are male contact elements, and the complementary contact elements 40A–40F are complementary female contact elements. In yet other embodiments, the set of contact elements 36 of the controller connector 34 could include both female contact elements and male contact elements, in which case the complementary contact elements 40 of the component connector 37 would be designed accordingly. In yet other embodiments (not shown in the figures), the set of contact elements 36 of the controller connector 34 are in the form of surface contact pads and the complementary contact elements 40A–40F are complementary surface contact pads adapted for establishing an electrical contact with corresponding contact elements 36 of the controller connector 34. As a variant (not shown in the figures), the set of contact elements 36 includes one or more data link contacts, which can be in the form of low voltage control lines or serial link contacts for example, for allowing data to be exchanged between the controller 30 and a spa component through a controller connector 34. The data may be exchanged in digital or analog format. These additional data link contacts can be use to send instructions to a particular spa component. The controller 30 can also receive some data from the spa component. For example, speed control information may be sent to a pump and the pump can send an acknowledgement or a status message to the controller.

The set of contact elements 36 of the connector 34 is arranged in a certain configuration that is common over connectors 34A–34G. In the particular example of implementation shown in FIG. 3B, the set of contact elements 36A–36F are arranged in a configuration that could be defined as a generally rectangular array of two rows by three columns.

Furthermore, each contact element 36 in the set of contact elements 36A–36F of the connector 34 is provided with a particular voltage, current output or is connected to ground. Moreover, the same particular voltage output or current output will be available at corresponding contact elements 36 of connectors 34A–34G. For example, the same particular output will be available at the contact element 36A of each one of the connectors 34A–34G; the same particular output will be available at the contact element 36B of each one of the connectors 34A–34G; and so on.

Figure 4:
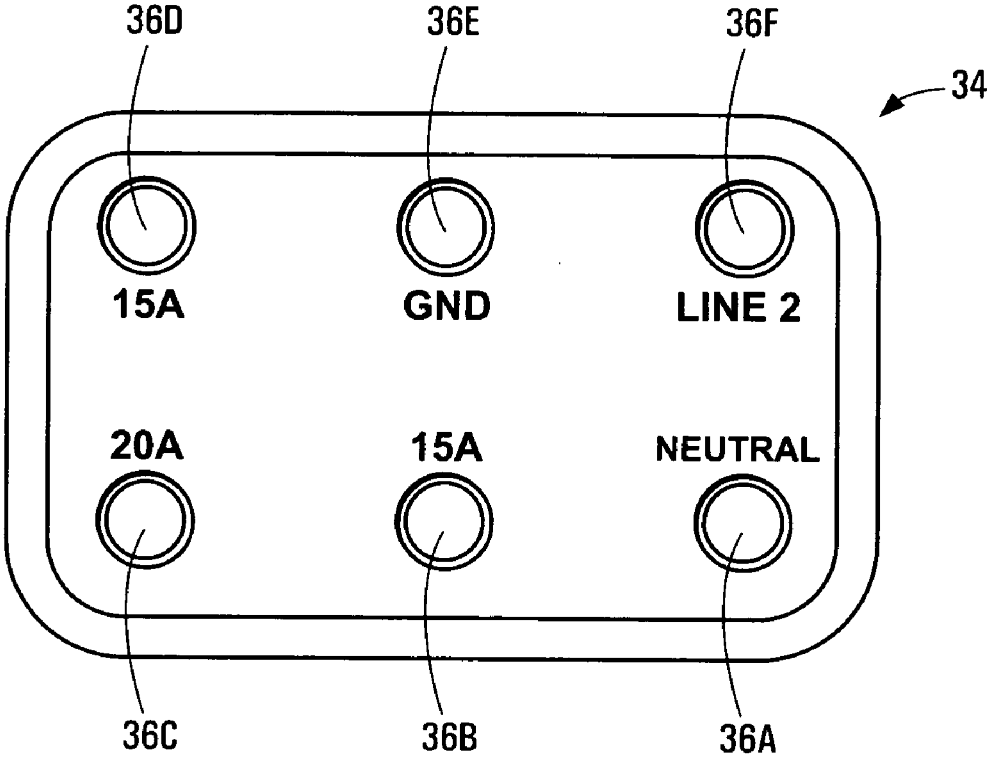
FIG. 4 shows a schematic representation of a contact element configuration for connectors shown in FIGS. 3A and 3B.
Figure 5A:
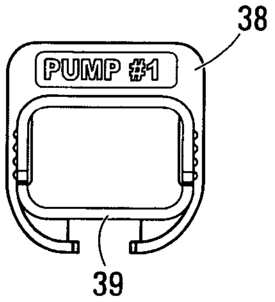
FIGS. 5A to 5H show examples of keying systems in accordance with specific examples of implementation of the present invention.
Figure 5B:
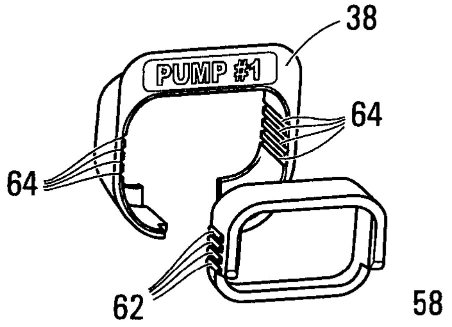
Figure 5C:
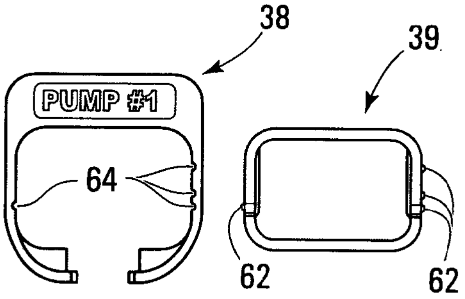
Figure 5D:
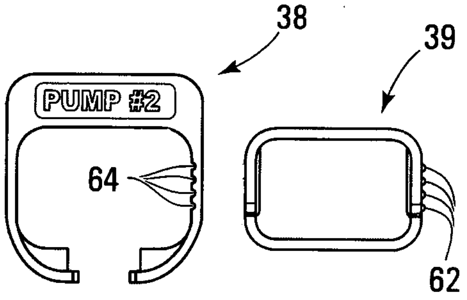
Figure 5E:
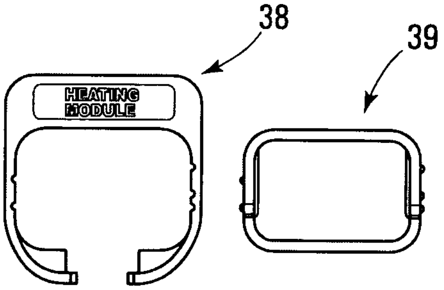
Figure 5F:
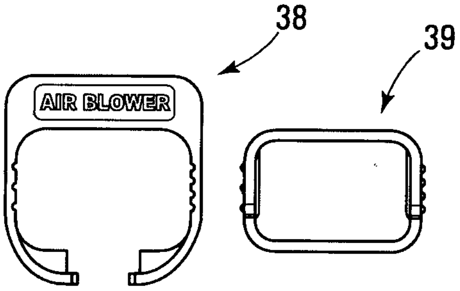
Figure 5G:
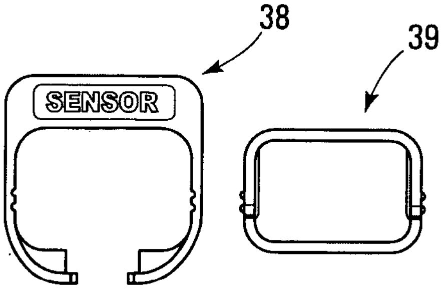
Figure 5H:
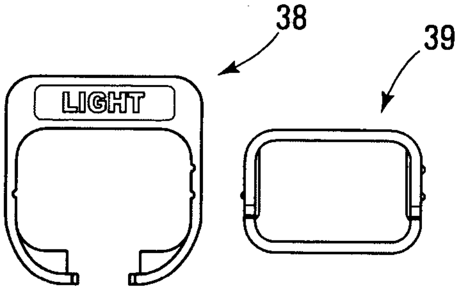

Shown in FIG. 4 is a configuration adapted for a North American 120/240 V single phase supply system, with a set of contact elements 36 of a connector 34 in accordance with a non-limiting example of implementation. Each one of the contact elements 36A–36F is provided with a certain voltage output, a certain current output or is connected to ground. Specifically, in this non-limiting embodiment:

- the contact element 36A is a terminal at which a neutral (supply grounded conductor) connection is available. There are 120 Volts between Neutral and each of switched contact element 36B, 36C and 36D which allows for a voltage of 120 Volts;
- the contact element 36B is a terminal at which a switched Line 1 conductor with an output current of 15 Amps (A) is available;
- the contact element 36C is a terminal at which a switched Line 1 conductor with an output current of 20 Amps (A) is available;
- the contact element 36D is a terminal at which a switched Line 1 conductor with an output current of 15 Amps (A) is available;
- the contact element 36E is the earth ground (GND) terminal; and
- the contact element 36F is a terminal at which a connection to the second line “line 2” is provided; There are 240 Volts between line 2 and each of switched contact element 36B, 36C and 36D which allows for a voltage of 240 Volts.

It will thus be appreciated that different combinations of two or more contact elements 36 in the set of contact elements 36A–36F form subsets of contact elements 36 having various current-voltage combinations. The various current-voltage combinations will be available at each connector 34 of the controller 30, through a common configuration of contact elements 36A–36F at each connector 34A–34G. As further detailed below, the actual voltage and current that will be supplied to a particular spa component 35 by way of a given connector 34 will be dictated by which ones of the complementary contact elements 40A–40F are present (or enabled, if all of the complementary contact elements 40 are included) on the component connector 37 of that particular spa component 35.

Referring back to FIG. 3B, the contact elements 36 of the connector 34 are mounted to a contact element holder 46, which can be made of a suitable dielectric material such as a plastic, ceramic, or any composite material having substantially negligible electrical conductivity. In turn, the contact element holder 46 is adapted to be received in a connector housing 48. Additionally, a seal or gasket 50 is disposed between the contact element holder 46 and the connector housing 48 for providing a fluid-tight and moisture-tight interface between these two components. The seal 50 can be made, for example, of silicone rubber or any other suitable impermeable material. Seal 50 may be omitted from certain implementation where the risk the controller 30 will be in contact with water is very low however, in most spa implementations, the use of a seal 50 is preferred.

The connector housing 48 may be formed integrally with a controller enclosure 52, only part of which is shown in dotted lines in FIG. 3B. Alternatively, the connector housing 48 could be separate from controller enclosure 52 and may be mounted thereto using any suitable method. The connector housing 48 defines a receptacle 54 that is adapted to receive the contact element holder 46 at one end and to receive the component connector 37 associated with a spa component 35 at the other end. In a specific implementation, the receptacle 54 defined by the connector housing 48 has a common configuration for each one of the connectors 34 of the controller 30. Advantageously, by providing a common receptacle configuration, the design and manufacturing of the controller enclosure 52 and the connector housings 48 is simplified.

In a non-limiting implementation, key member 38 is engaged in the connector housing 48. It will be appreciated, that the key member 38 can be made separately from the controller 30 such that it is adapted to engage the connector housing 48 at the end of the manufacturing of the controller 30. Furthermore, the key members 38 may be permanently engaged to the connectors 34 or, alternatively, they may be releasably engaged to the connectors 34. More specifically, the key member 38 depicted in FIG. 3*b* includes a tubular portion for slidingly engaging the receptacle 54 defined by the connector housing 48 and optionally a rim portion adapted for extending being the receptacle 54. It will be appreciated that when the key member 38 is engaged in the receptacle 54 defined by the connector housing 48 is may be permanently engaged therein or may be removable by sliding the key member 38 out of the receptacle. The rim portion may include descriptive indicia for facilitating the location of a spa component having a complementary key matching the key member 38. The inner wall of the tubular portion of key member 38 includes protrusions and/or notches in a certain pattern defining the key. The key member 38 will be described in greater detail later on in the specification.

On the spa component side, the component connector 37 comprises a main housing 72 that is made of an electrically non-conductive material and that is coupled to a cable 74 extending from a spa component 35. The main housing 72 is adapted to support a number of complementary contact elements 40. Each one of the contact elements 40 may be electrically connected to a conductor wire extending in the cable 74 to the spa component 35. In the embodiment shown, the contact elements 40 are in the form of male pins that are made of an electrically conductive material, and that are adapted to mate with the contact elements 36 of the connector 34.

As described previously, each contact element 36 in the set of contact elements 36A–36F of connector 34 is associated with a certain voltage or current output. Accordingly, depending on the power requirements of a particular spa component 35, the component connector 37 associated with that particular spa component will only include certain ones of the complementary contact elements 40. In a non-limiting implementation, a particular component connector 37 will only include the certain contact elements 40 that correspond to the contact elements 36 of the connector 34 that are defined as the contact elements at which will be available voltage and current outputs corresponding to the power requirements of the spa component 35 associated with that particular connector 37. In an alternative implementation, the component connector 37 could include each one of the contact elements 40, but with the non-required contact elements 40 disabled, i.e. not connected to any internal conductor wires in the cable 74 extending from the spa component 35.

Figure 6:
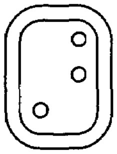
FIGS. 6(*a*) to 6(*h*) show examples of component connector configurations for components having various power requirements in accordance with specific examples of implementation of the present invention.
Figure 6:
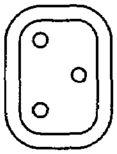
Figure 6:
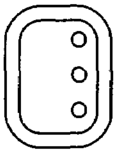
Figure 6:
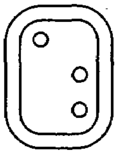
Figure 6:
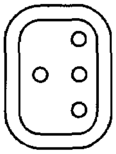
Figure 6:
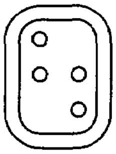
Figure 6:
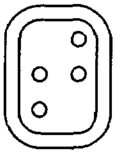
Figure 6:
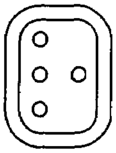

With reference to FIGS. 6(*a*) to 6(*h*) and contact element 36 configuration shown in FIG. 4, there are shown a number of examples illustrating subsets the contact elements 40A–40F in component connector 37 associated with a particular spa component 35 having operating voltage and current requirements. In a situation wherein all of the contact elements 40 are included in a component connector 37, the contact elements 40 present in each example shown in FIGS. 6(*a*) to 6(*h*) represent an enabled contact element 40. For instance, FIG. 6(*a*) shows that a spa component 35 having operating voltage and current requirements of 120 volts (V) and 15 amps (A), respectively, will have a component connector 37 that includes (or has enabled) contact elements 40A, 40D, and 40E. Similarly, FIG. 6(*d*) shows that another spa component 35 having operating voltage and current requirements of 240 volts (V) and 20 amps (A), respectively, will have a component connector 37 that includes (or has enabled) contact elements 40C, 40E, and 40F.

Therefore, the actual voltage and current that will be supplied to a particular spa component 35 will be determined by which ones of the contact elements 40 are present (or enabled) on the component connector 37 of that particular spa component 35. This allows for each one of the spa components 35 that is to be connected to the controller 30 to receive a power signal in accordance with its power requirements while allowing connectors 34 having a common contact element configuration to be used.

In a non-limiting implementation, complementary key member 39 is engaged with the main housing 72. The complementary key member 39 can be made separately from the component connectors 37 and may be adapted to engage the component connectors 37, either permanently or releasably, at the end of the manufacturing of the spa component 35 and component connector 37. In the example depicted, the complementary key member 38 engages the outer surface of main housing 72. It will be appreciated that when the complementary key member 39 is engaged with the main housing 72 is may be permanently engaged therewith or may be removable therefrom. The complementary key member 38 may include descriptive indicia for facilitating the location of a connector having a key member 38 matching the complementary key member 39. The outer wall of the complementary key member 39 includes protrusions and/or notches in a certain pattern defining a complementary key to key member 38. The complementary key member 39 will be described in greater detail later on in the specification. It will be appreciated that certain embodiments may omit the complementary key member 39 and key member 38.

More specifically, a key member 38 can be added to a particular connector 34, and a complementary key member 39 that matches that key member 38 can be added to the component connector 37 of the spa component that is expected to connect to that particular connector 34. In this fashion, the connector 34 can be connected to the component connector 37 having the matching complementary key member 39.

Referring back to FIG. 3B, the contact elements 36 of the connector 34 are adapted to be electrically connected to a printed circuit board 42. The printed circuit board 42 receives power via service wiring 31 (shown in FIG. 2) from a conventional electric power source 29. The printed circuit board 42 includes a variety of electrical components and patterns of printed wiring conductor traces that interconnect the variety of electrical components and the service wiring 31. Each one of the contact elements 36 may be directly connected to a respective one of the printed conductor traces, for example, by a soldered connection, or any other suitable method known in the art. Alternatively, each contact element 36 may be connected to a respective one of the printed conductor traces of the printed circuit board 42 via a respective conductor wire extending from the contact element to the printed conductor trace. The printed circuit board 42 is designed to either directly route, or convert and route directly or through a relay, the power received from service wiring 31 such as to achieve the particular voltage or current expected to be made available at each contact element 36 of the connector 34. In a specific non-limiting implementation, the service wiring 31 includes a first line "line 1", a second line "line 2", a Neutral and earth ground conductor connected to 120/240 V single phase supply system.

In addition, the printed circuit board 42 includes a control circuit element connected to the variety of electrical components on the board and adapted to receive signals from various input devices of the spa system 10, such as the spa control panel 32 and various spa sensors 70 (shown in FIG. 1). The control circuit element is adapted to control the operation of the various electrical components of the printed circuit board 42 on the basis of the signals received from the various input devices such as to enable or disable the particular voltage or current expected to be available at any one of the contact elements 36. For example, in a typical interaction, a user of the spa enters commands via the spa control panel 32 in order to activate a particular spa component. The control circuit element, upon receiving signals generated by the control panel 32 on the basis of the entered commands, controls the various electrical components of the printed circuit board 42 such as to enable the connector 34 associated with the particular spa component 35. Similarly, if a water level sensor was to generate a signal upon detecting an unacceptable water level in a particular spa component 35 such as the pump 12 or the heating module 60 (shown in FIG. 1), the control circuit element, upon receiving the generated signal, could control the various electrical components of the printed circuit board 42 such as to disable the voltage and/or current available at the contact elements 36 of the connector 34 associated with the pump 12 or the heating module 60.

It is to be understood that the functionality of the control circuit element could be implemented by any suitable hardware and/or hardware/software combination without departing from the spirit and scope of the present invention. In a non-limiting example, the control circuit element is in the form of a microprocessor. In addition, it will also be appreciated that the control circuit element could be implemented by other suitable circuitry, including, by way of example only, an application-specific integrated circuit (ASIC), or discrete logic circuitry.

The plurality of connectors 34 of the controller 30 may be connected to a single printed circuit board 42 or alternatively, each connector 34 of the controller 30 may be connected to a respective printed circuit board 42. In yet another alternative implementation, groups of connectors 34 are connected to a respective printed circuit board 42.

In a non-limiting implementation, the controller 30 is configured, through the design of the control circuit element, to associate each connector 34 to a particular spa component 35, such as a pump 12 or a heating module 60 (shown in FIG. 1). Therefor, when a signal indicating that the pump 12 or heating module 60 should be turned off, the controller 30 is adapted to prevent the connector 34 corresponding to the spa component from providing electrical power to that spa component.

The keying system including key member 38 and complementary key member may be used in combination with the connectors 34 in order to specify a connection pattern for the spa components. More specifically, a key member 38 can be added to a particular connector 34, and a complementary key member 39 that matches that key member 38 can be added to the component connector 37 of the spa component that is expected to connect to that particular connector 34. In this fashion, the connector 34 can be connected to the component connector 37 having the matching complementary key member 39.

In a non-limiting implementation, the keying system is designed such as to prevent the connector 34 from being connected to a component connector 37 having a non-matching component key member 39. As a result, in this non-limiting implementation, the key member 38 of a particular connector 34 ensures that only a particular spa component 35 that is expected to be electrically connected to that particular connector 34 can be connected to that particular connector 34. For example, the key member 38 of a particular connector 34 that is expected, by way of configuration of the controller 30, to be connected to a pump of the spa system 10, will only allow a pump having a component connector 37 with a matching complementary key member 39 to be connected to that connector 34, and will prevent any other type of spa component 35 from being connected to that connector 34.

FIGS. 5A to 5H illustrate a set of possible designs for the key members 38 and the complementary key members 39, in accordance with specific examples of implementation of the present invention. Each key member 38 and each complementary key member 39 includes a respective body including a particular combination of protrusions 62 and/or grooves 64. In the specific example of implementation shown in FIGS. 5A to 5H, it is the key member 38 that includes the grooves 64 and the complementary key member 39 that includes the protrusions 62. It should be understood however, that in an alternative embodiment, the key member 38 could include the protrusions 62 and the complementary key member 39 could include the grooves 64. In yet other embodiments, the key member 38 and the complementary key member 39 could each include a combination of protrusions 62 and grooves 64. In order for a key member 38 and a complementary key member 39 to match, the pattern of grooves 64 on the key member 38 corresponds to the pattern of protrusions 62 on the complementary key member 39. As such, a particular complementary key member 39 will match a key member 38 if their respective protrusions 62 and grooves 64 match in a complementary manner.

A different design of grooves 64 and protrusions 62 is employed for each different key member 38 and matching complementary key member 39. Therefore, each type of spa component 35 is provided with a key member 38 and complementary key member 39 that are different from the key members 38 and complementary key members 39 associated with other types of spa component 35. That is, a particular key member 38 design and a matching complementary key member 39 design are assigned to a pump; another particular key member 38 design and a matching complementary key member 39 design are assigned to a heating module; and so on. In addition, each key member 38 and matching complementary key member 39 may be produced in a distinct color and/or include a distinct indicia marking, in order to further facilitate ease of connection between the connectors 34 and component connectors 37. In a non-limiting implementation, the indicia marking includes a set of alpha-numeric characters, one or more symbols or drawings or any other suitable indicia to further facilitate ease of connection between the connectors 34 and component connectors 37. For example, the keying system shown in 5*c* includes the indicia "PUMP #1"; the keying system shown in 5*d* includes the indicia "PUMP #2"; the keying system shown in 5*e* includes the indicia "HEATING MODULE" and so on.

The interaction between the complementary key member 39 on the component connector 37 and the key member 38 of each connector 34 will allow a particular spa component 35 to be connected to the correct connector 34. This prevents a spa installer or service person from connecting a spa component 35 in the wrong connector 34 of the controller 30, so as to prevent connecting a spa component 35 to a connector 34 not intended to be connected to that spa component.

Those skilled in the art will appreciate that various modifications and refinements can be made to the embodiments presented above without detracting from the scope of the present invention.

Figure 7:
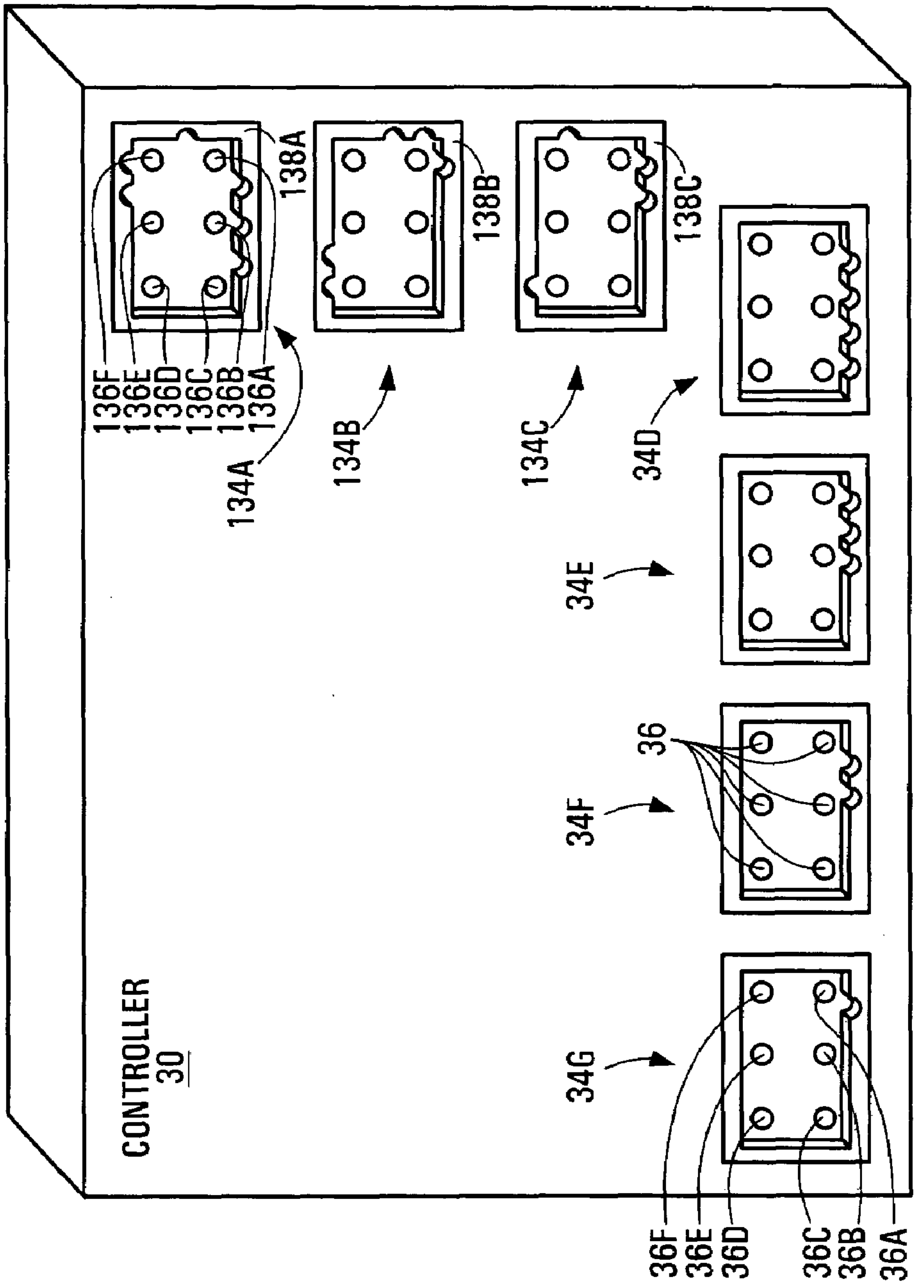
FIG. 7 shows a schematic representation of a controller in accordance with a second specific embodiment of the present invention.

For instance, FIG. 7 shows a possible variant of a controller 30 in accordance with another specific example of implementation of the present invention. In this variant, the controller 30 includes a first set of connectors 34A–34D and a second set of connectors 134A–134C, which are both implemented in accordance with the principles of the present invention. Each connector of the first set of connectors 34A–34D includes a set of contact elements 36 arranged in a certain configuration and having a voltage or current output available at each contact element 36 that is common over all of the connectors 34A–34D. Similarly, each connector 134A–134C of the second plurality of connectors 134 also includes a set of contact elements 136 arranged in a certain configuration and having a voltage or current output available at each contact element 136 that is common over all of the connectors 134A–134C.

Figure 8:
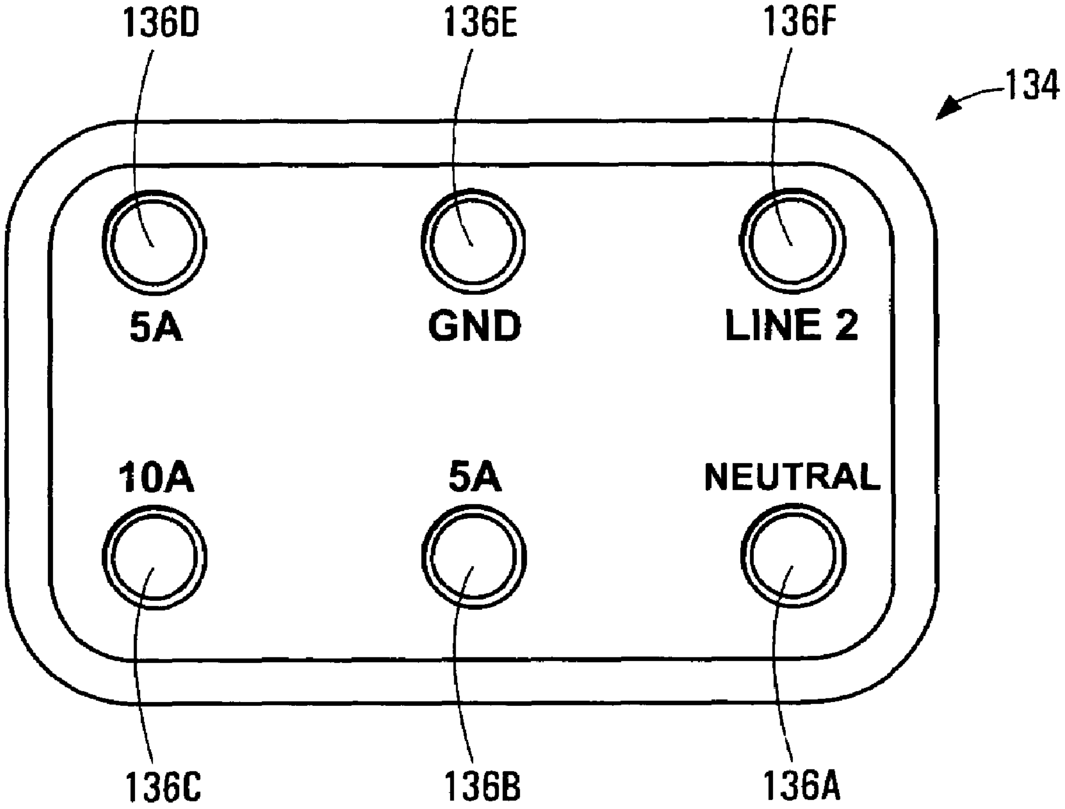
FIG. 8 shows a schematic representation of the contact element configuration for some of the connectors of the controller shown in FIG. 7.

However, in this embodiment, the voltage or current output available at each contact element 36 of each connector of the first plurality of connectors 34A–34D is different from the voltage or current output available at each contact element 136 of each connector 134 of the second plurality of connectors 134A–134C. For example, the voltage or current output available at each contact element 36 of each connector of the first plurality of connectors 34A–34D could be as defined above in connection with FIG. 4. In contrast, the voltage or current output available at each contact element 136 of each connector of the second plurality of connectors 134A–134C could be defined as shown in FIG. 8. Specifically, in this non-limiting embodiment, the contact element is a terminal at which an output voltage of 120 volts (V) is available; the contact element 136B is a terminal at which an output current of 5 amps (A) is available; the contact element 136C is a terminal at which another output current of 10 amps (A) is available; the contact element 136D is a terminal at which an output current of 5 amps (A) is available; the contact element 136E is a ground terminal; and the contact element 136F is a terminal at which an output voltage of 240 volts (V) is available.

It will therefore be appreciated that the connectors 34A–34D may be defined as a high-current connector suitable to be connected with a spa component 35 such as a pump 12 or a blower 24 (FIG. 1), while the connectors 134A–134C may be defined as a low-current connector suitable to be connected with other spa components such as ozonator and small circulating pump. In addition, although the above embodiment illustrates a controller 30 including first and second pluralities of connectors 34 and 134, respectively, it is to be understood that the controller could include any number of pluralities of connectors each with a respective contact element definition set. In addition, the configuration of the contact elements and/or the number of contact elements may be different in the first plurality of connectors 34A–34D and in the second plurality of connectors 134A–134C without detracting from the spirit of the invention.

The above description of the embodiments should not be interpreted in a limiting manner since other variations, modifications and refinements are possible within the spirit and scope of the present invention. The scope of the invention is defined in the appended claims and their equivalents.

What is claimed is:

1. A controller suitable for use in controlling components in a bathing unit, said controller comprising:

a. a controller body;

b. a plurality of connectors positioned on said controller body, each connector in said plurality of connectors being adapted for providing electrical power to a respective bathing unit component, each connector of said plurality of connectors being adapted for matingly engaging a complementary connector associated to a respective bathing unit component each connector in said plurality of connectors including:

i. a set of contact elements arranged in a common configuration, wherein;

1. a first subset of said set of contact elements is adapted for generating a power signal characterized by a first current-voltage combination; and 2. a second subset of said set of contact elements is adapted for generating a power signal characterized by second current-voltage combination;

c. a control circuit positioned within said controller body, in use said control circuit being adapted for selectively providing electrical power to respective bathing unit components through the plurality of connectors.

2. A controller as defined in claim 1, said controller further comprising a plurality of key members connected to respective connectors in the plurality of connectors so as to allow bathing unit components having complementary key members to be connected to connectors having key members matching the complementary key members.

3. A controller as defined in claim 1, wherein said set of contact elements includes a plurality of subsets of contact elements characterized by respective current-voltage combinations.

4. A controller as defined in claim 2, wherein said key members are adapted for releasably engaging said connectors.

5. A controller as defined in claim 1, wherein each of said connectors is adapted to acquire an actuated state and a non-actuated state, when in the actuated state a connector being adapted for providing electrical power to a bathing unit component, when in the non-actuated state a connector being prevented from providing electrical power to a bathing unit component, said control circuit being adapted for:

a. receiving control signals associated to components in the bathing unit, b. causing selected ones of the plurality of connectors to acquire either one of the actuated state and the non-actuated state on the basis of the control signals.

6. A controller as defined in claim 1, wherein:

a. said first subset of said set of contact elements is adapted for establishing electrical connections with complementary contact elements associated to a first bathing unit component such as to release a signal characterized by the first current-voltage combination; and b. said second subset of said set of contact elements is adapted for establishing electrical connections with complementary contact elements associated to a second bathing unit component such as to release a signal characterized by the second current-voltage combination.

7. A controller as defined in claim 1, wherein said set of contact elements includes a port for transmitting data to a bathing unit component.

8. A controller as defined in claim 7, wherein said port is adapted for receiving data from a bathing unit component.

9. A controller as defined in claim 8, wherein said port is an analog port.

10. A controller as defined in claim 7, wherein said port is in the form of a serial link.

11. A connector suitable for use in a bathing unit controller for providing electrical power to a bathing unit component, said connector including a set of contact elements, wherein;

a. a first subset of said set of contact elements is adapted for generating a power signal characterized by a first current-voltage combination; and b. a second subset of said set of contact elements is adapted for generating a power signal characterized by second current-voltage combination; said connector being adapted for matingly engaging a complementary connector associated to a bathing unit component, when said connector is in use in a bathing unit controller, said connector providing power to the bathing unit component associated to the complementary connector.

12. A connector as defined in claim 11, wherein:

a. said first subset of said set of contact elements is adapted for establishing electrical connections with complementary contact elements associated to a first bathing unit component such as to release a signal characterized by the first current-voltage combination; and b. said second subset of said set of contact elements is adapted for establishing electrical connections with complementary contact elements associated to a second bathing unit component such as to release a signal characterized by the second current-voltage combination.

13. A controller suitable for use in controlling components in a bathing unit, said controller comprising:

a. a controller body;

b. a plurality of connectors positioned on said controller body for supplying electrical power to a set of bathing unit components;

c. a plurality of key members adapted to be connected to respective connectors in the plurality of connectors, the plurality of connectors allowing bathing unit components having complementary key members to be connected to connectors having key members matching the complementary key members;

d. a control circuit positioned within said controller body, in use said control circuit being adapted for selectively providing electrical power to respective bathing unit components through the plurality of connectors.

14. A controller as defined in claim 13, wherein said pluralities of key members are adapted for releasably engaging said connectors.

15. A controller as defined in claim 13, wherein said plurality of key members, when engaging said plurality of connectors, defines a bathing unit component connection pattern.

16. A controller as defined in claim 15, wherein said control circuit is adapted for controlling a supply of power to said plurality of correctors in accordance with the bathing unit component connection pattern.

17. A controller as defined in claim 13, wherein each of said connectors is adapted to acquire an actuated state and a non-actuated state, when in the actuated state a connector being adapted for providing electrical power to a bathing unit component, when in the non-actuated state a connector being prevented from providing electrical power to a bathing unit component, said control circuit being adapted for:

a. receiving control signals associated to components in the bathing unit;

b. causing selected ones of the plurality of connectors to acquire either one of the actuated state and the non-actuated state on the basis of the control signals.

18. A controller as defined in claim 13, wherein each connector in said plurality of connectors includes:

a. a set of contact elements arranged in a common configuration, wherein;

i. a first subset of said set of contact elements is adapted for generating a power signal characterized by a first current-voltage combination; and ii. a second subset of said set of contact elements is adapted for generating a power signal characterized by second current-voltage combination.

19. A controller as defined in claim 18, wherein said set of contact elements includes a plurality of subsets of contact elements characterized by respective current-voltage combinations.

20. A controller as defined in claim 18, wherein:

a. said first subset of said set of contact elements is adapted for establishing electrical connections with complementary contact elements associated to a first bathing unit component such as to release a signal characterized by the first current-voltage combination; and b. said second subset of said set of contact elements is adapted for establishing electrical connections with complementary contact elements associated to a second bathing unit component such as to release a signal characterized by the second current-voltage combination.

21. A keying system suitable for use in a bathing unit controller, the bathing unit controller including a connector adapted for providing electrical power to a bathing unit component, the bathing unit component including an electrical plug, said keying system comprising:

a. a key member adapted for engaging the connector;

b. a complementary key member adapted for engaging the electrical plug, so as to enable the electrical plug and the connector to establish an electrical connection when the key member and the complementary key member match such as to allow the connector to provide power to the bathing unit component through the electrical plug.

22. A keying system as defined in claim 21, wherein said key member includes descriptive indicia for facilitating location of a complementary key member matching the key member.

23. A keying system as defined in claim 21, wherein said descriptive indicia includes alpha-numeric characters.

24. A keying system as defined in claim 21, wherein said key member includes color indicia for facilitating location of a complementary key member matching the key member.

25. A keying system as defined in claim 21, wherein said key member is adapted for releasably engaging the connector.

26. A keying system as defined in claim 21, wherein said complementary key member is adapted for releasably engaging the electrical plug.

27. A bathing unit component suitable for use in a bathing unit having a controller, the controller comprising a plurality of connectors for supplying electrical power, said bathing unit component comprising a plug member having a complementary key member connected to said plug member so as to allow the bathing unit component to be connected to a connector on the controller having a matching key for providing power the bathing unit component through the plug member.

28. A bathing unit system comprising in combination:

a. a controller suitable for use in controlling components in a bathing unit, said controller comprising:

i. a controller body;

ii. a plurality of connectors positioned on said controller body, each connector in said plurality of connectors being adapted for providing electrical power to a respective bathing unit component, each connector of said plurality of connectors being adapted for matingly engaging a complementary connector associated to a respective bathing unit component, each connector in said plurality of connectors including:

1. a set of contact elements arranged in a common configuration, wherein:

a. a first subset of said set of contact elements is adapted for generating a power signal characterized by a first current-voltage combination; and b. a second subset of said set of contact elements is adapted for generating a power signal characterized by second current-voltage combination;

iii. a control circuit positioned within said controller body, in use said control circuit being adapted for controlling a supply of electrical power to respective bathing unit components through the plurality of connectors;

b. a plurality of bathing unit components adapted to engage respective ones of the plurality of connectors.

29. A combination as described in claim 28, wherein said combination comprises:

a. a plurality of key members adapted for engaging said plurality connectors;

b. a plurality of complementary key members adapted for engaging respective bathing unit components so as to allow the bathing unit components to be connected to connectors having a matching key.

30. A combination as defined in claim 28, wherein said set of contact elements includes a plurality of subsets of contact elements characterized by respective current-voltage combinations.

31. A combination as described in claim 29, wherein said key members are adapted for releasably engaging said connectors.

32. A combination as described in claim 28, wherein each of said connectors is adapted to acquire an actuated state and a non-actuated state, when in the actuated state a connector being adapted for providing electrical power to a bathing unit component, when in the non-actuated state a connector being prevented from providing electrical power to a bathing unit component, said control circuit being adapted for:

a. receiving control signals associated to components in the bathing unit;

b. causing selected ones of the plurality of connectors to acquire either one of the actuated state and the non-actuated state on the basis of the control signals.

33. A combination as described in claim 28, wherein:

a. said first subset of said set of contact elements is adapted for establishing electrical connections with complementary contact elements associated to a first bathing unit component of said plurality of bathing unit components such as to release a signal characterized by the fist current-voltage combination; and b. said second subset of said set of contact elements is adapted for establishing electrical connections with complementary contact elements associated to a second bathing unit component of said plurality of bathing unit components such as to release a signal characterized by the second current-voltage combination.

34. A combination as described in claim 28, wherein said plurality of bathing unit components includes a heating module.

35. The combination described in claim 28, wherein said plurality of bathing unit components includes a pump.

36. A controller suitable for use in controlling components in a bathing unit, said controller comprising:

a. a controller body;

b. a plurality of connector means positioned on said controller body for supplying electrical power to a set of bathing unit components;

c. a plurality of key means connected to respective connector means in the plurality of connector means so as to allow bathing unit components having complementary key members to be connected to connector means having key means matching the complementary key members;

d. control circuit means positioned within said controller body, in use said control circuit means being adapted for selectively providing electrical power to respective bathing unit components through the plurality of connectors means.

37. A controller for use in controlling bathing unit components in a bathing unit system, said controller comprising:

a, a controller body;

b. a plurality of connector interfaces positioned on said controller body, each connector interface of said plurality of connector interfaces being adapted for matingly engaging a complementary connector associated to a respective bathing unit component, at least some connector interfaces of said plurality of connector interfaces including descriptive indicia, the descriptive indicia providing guidance in locating corresponding complementary connectors associated to bathing unit components;

c. a control circuit positioned within said controller body, in use said control circuit being adapted for selectively providing electrical power to respective bathing unit components through the plurality of connector interfaces.

38. A controller as defined in claim 37, wherein the descriptive indicia includes alpha-numeric characters.

39. A controller as defined in claim 38, wherein the descriptive indicia includes color indicia.

40. A controller as defined in claim 39, wherein the color indicia allow effecting connections between the plurality of connector interfaces and the complementary connectors associated to bathing unit components on the basis of a color code.

41. A controller as defined in claim 37, wherein said controller body includes a back surface and a front surface generally opposed to said back surface, said plurality of connector interfaces being positioned on the front surface of said controller body.

42. A controller as defined in claim 37, wherein said control circuit includes printed conductor traces, at some of said connector interfaces establishing a direct contact with the printed conductor traces.

* * * * *

UNITED STATES PATENT AND TRADEMARK OFFICE

CERTIFICATE OF CORRECTION

PATENT NO. : 6,929,516 B2 
DATED : August 16, 2005
INVENTOR(S) : Christian Brochu et al.

It is certified that error appears in the above-identified patent and that said Letters Patent is hereby corrected as shown below:

Title page,
Item [54], Title, replace "THEREFORE" with -- THEREFOR --.

Signed and Sealed this

Twenty-seventh Day of December, 2005

JON W. DUDAS
*Director of the United States Patent and Trademark Office*